(12) United States Patent
Coats

(10) Patent No.: US 8,485,773 B2
(45) Date of Patent: Jul. 16, 2013

(54) DEVICE FOR MOVING LARGE CONTAINERS

(75) Inventor: Zane Sheridan Coats, Eugene, OR (US)

(73) Assignee: Canjack Incorporated, Eugene, OR (US)

( * ) Notice: Subject to any disclaimer, the term of this patent is extended or adjusted under 35 U.S.C. 154(b) by 265 days.

(21) Appl. No.: 12/870,680

(22) Filed: Aug. 27, 2010

(65) Prior Publication Data

US 2011/0049823 A1  Mar. 3, 2011

Related U.S. Application Data

(60) Provisional application No. 61/237,488, filed on Aug. 27, 2009.

(51) Int. Cl.
*B62B 1/06* (2006.01)

(52) U.S. Cl.
USPC ........... 414/453; 414/450; 414/490; 280/47.3

(58) Field of Classification Search
USPC . 414/444, 447, 450, 453, 454, 490; 280/47.3, 280/79.5; 254/3 C, 3 R, 8 C, 8 R
See application file for complete search history.

(56) References Cited

U.S. PATENT DOCUMENTS

| | | | | | |
|---|---|---|---|---|---|
| 224,694 | A | * | 2/1880 | Johnson | 414/453 |
| 536,629 | A | * | 4/1895 | Hvass | 254/3 R |
| 2,609,950 | A | * | 9/1952 | Chambers, Jr. | 414/452 |
| 2,903,147 | A | * | 9/1959 | Davis, Jr. | 414/490 |
| 3,208,614 | A | * | 9/1965 | Armitage et al. | 414/447 |
| 3,845,968 | A | * | 11/1974 | Larson | 280/654 |
| 4,113,214 | A | * | 9/1978 | Dubois | 248/146 |
| 4,281,957 | A | * | 8/1981 | Vishe et al. | 414/457 |
| 4,375,935 | A | * | 3/1983 | Miller | 414/454 |
| 5,593,271 | A | * | 1/1997 | Hall | 414/490 |
| 6,637,761 | B1 | * | 10/2003 | Boettcher | 280/47.24 |
| 7,243,905 | B2 | * | 7/2007 | Henderson | 254/8 R |
| 2003/0194303 | A1 | * | 10/2003 | Lunger | 414/444 |

FOREIGN PATENT DOCUMENTS

| | | | | |
|---|---|---|---|---|
| EP | 0174023 A2 | * | 3/1986 | 280/47.3 |
| WO | WO 92/13745 A1 | * | 8/1992 | 414/490 |

* cited by examiner

*Primary Examiner* — James Keenan
(74) *Attorney, Agent, or Firm* — Schwabe, Williamson & Wyatt

(57) ABSTRACT

Devices and methods of using such devices to move containers are disclosed herein. A device may include a first piece with a wheel adjacent one end and a second piece attached to the first piece at a pivotal connection. The second piece may include a lift portion on one side of the pivotal connection and a handle on an opposite side of the pivotal connection. The handle may be adapted to be pivoted about an axis of the pivotal connection to cause the lift portion to lift a portion of the container.

16 Claims, 2 Drawing Sheets

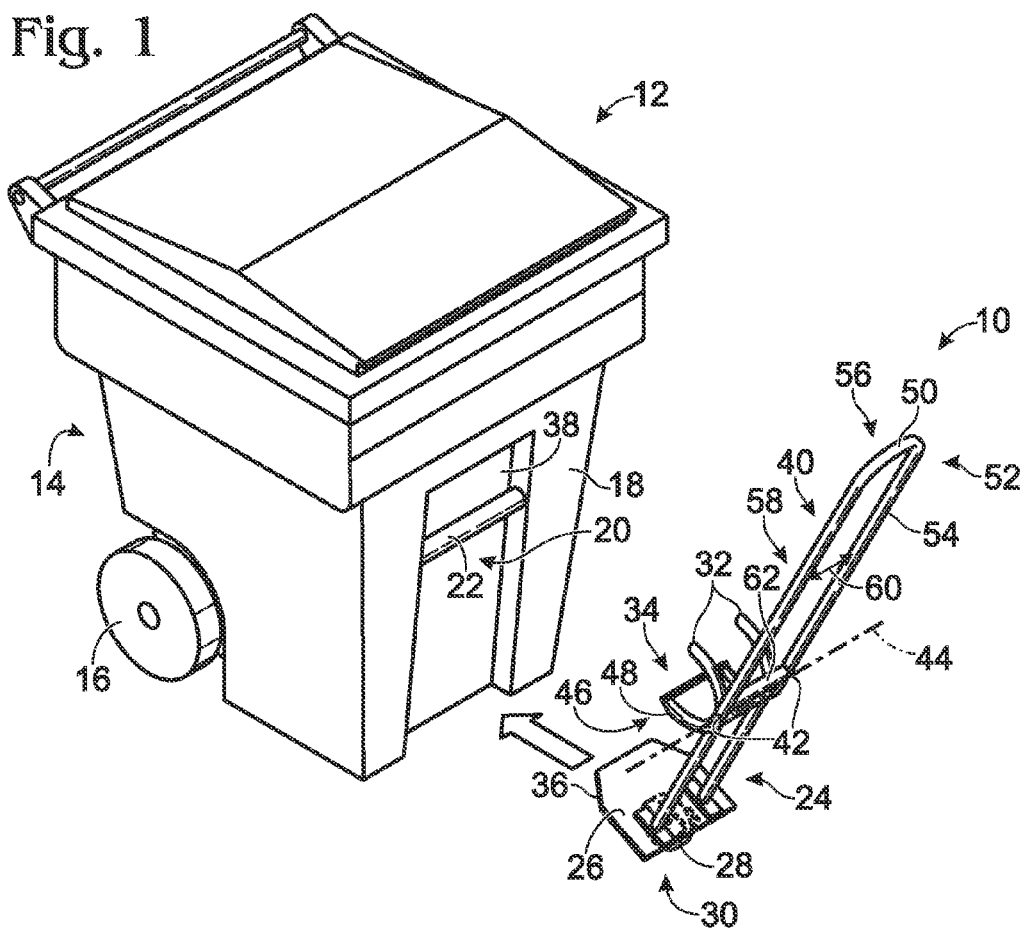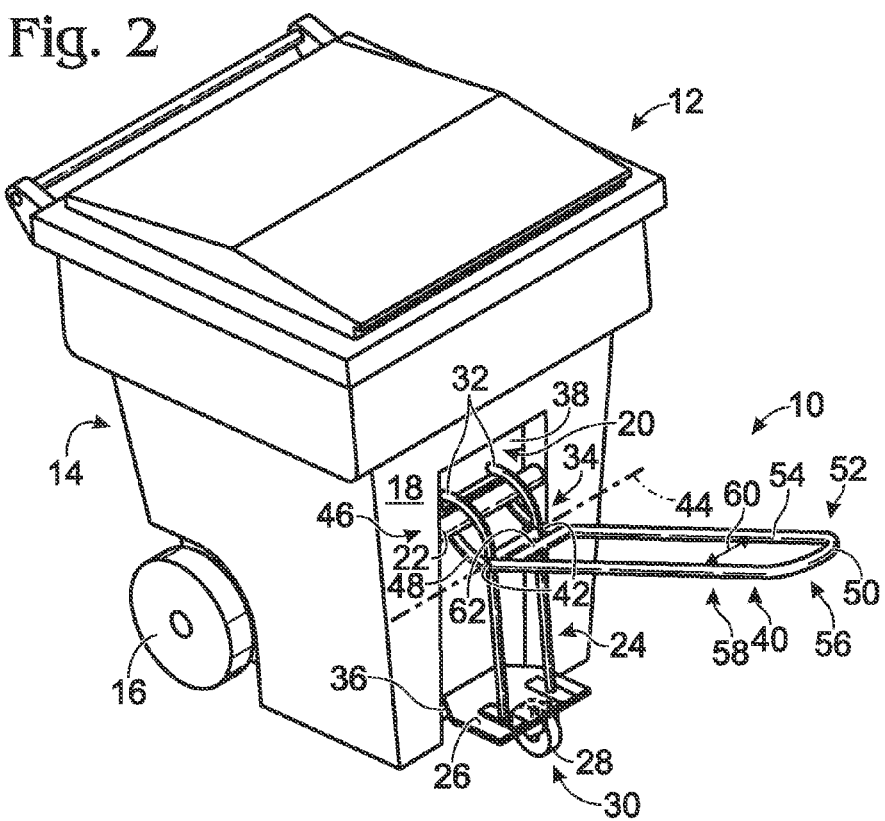

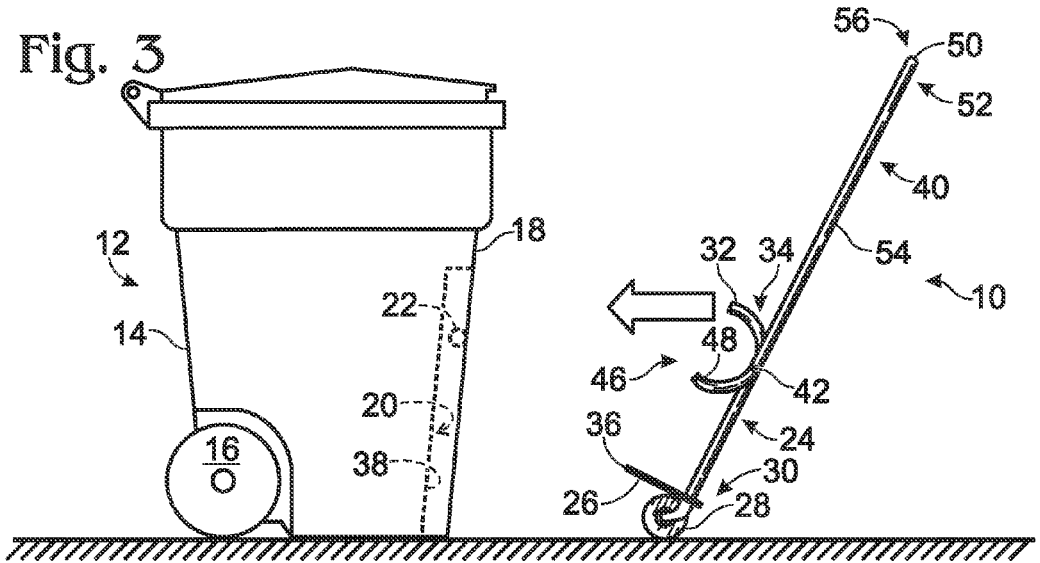
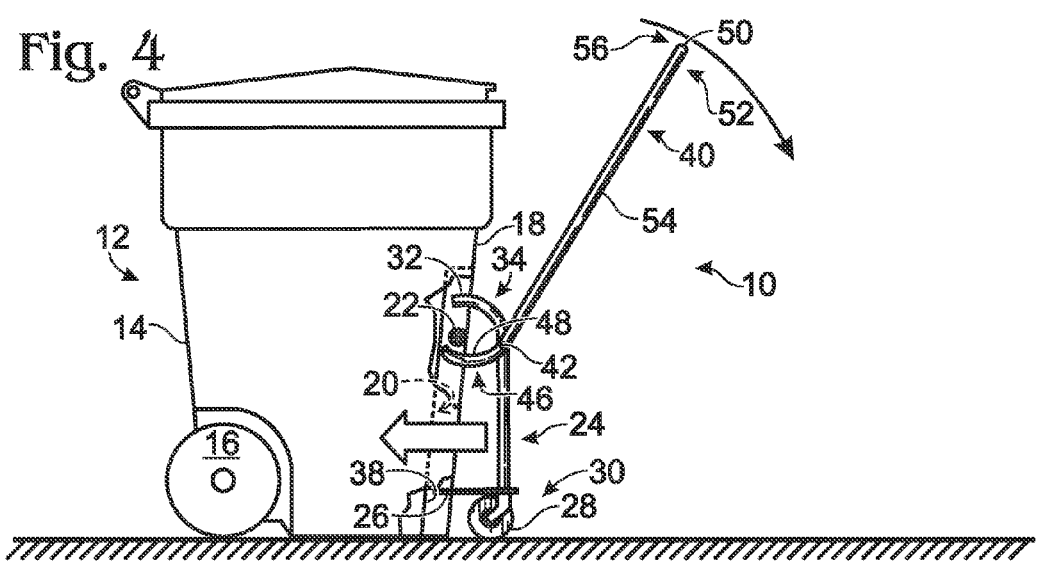
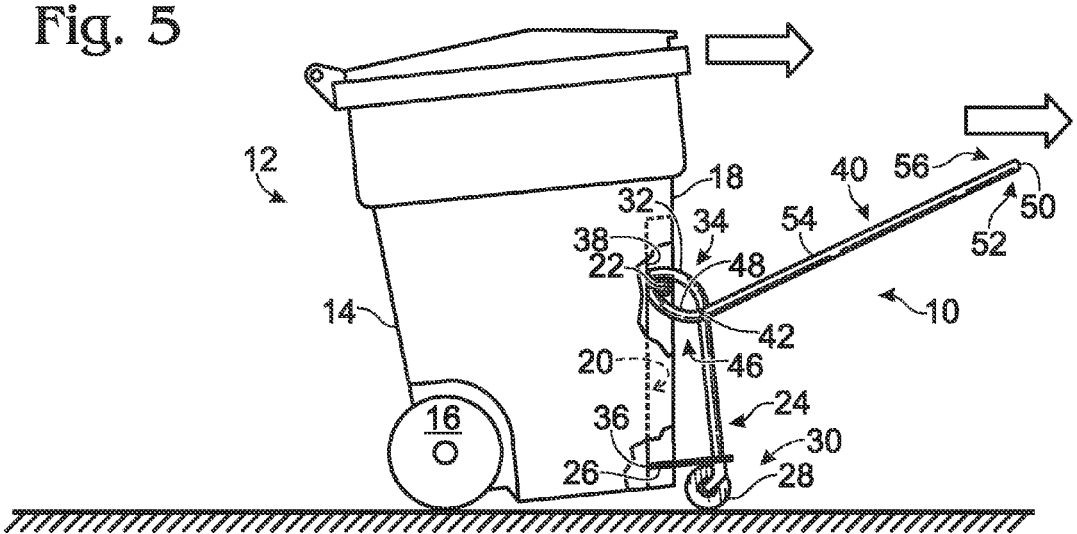

DEVICE FOR MOVING LARGE CONTAINERS

CROSS-REFERENCE TO RELATED APPLICATIONS

This application claims priority to U.S. Provisional Patent Application Ser. No. 61/237,488, filed Aug. 27, 2009 and entitled DEVICE FOR MOVING LARGE CONTAINERS, the complete disclosure of which is herein incorporated by reference for all purposes.

BACKGROUND

Some large containers include wheels or other similar mechanisms to aid with movement. For example, large garbage or recycling containers often include two wheels on one side and a lift bar or handle or other similar means on the opposite side. At rest, the side without the wheels sits on the ground and prevents the container from moving. When the container is to be moved, the lift bar can be used to lift the side opposite the wheels off the ground, so that the side with wheels can be rolled to move the container between locations. Some such containers are referred to as "toter-style" trashcans.

A "toter-style" trashcan tends to become heavy when it is filled with debris, which makes it difficult to lift the side opposite the wheels so that the trashcan may be moved. People with disabilities, particularly those that are wheelchair-bound, may be unable to lift the side of the trashcan opposite the wheels.

BRIEF DESCRIPTION OF THE DRAWINGS

FIG. 1 depicts an exemplary device for moving large containers.

FIG. 2 depicts the exemplary device of FIG. 1 as it may be used to move a container.

FIG. 3 is a side view of an exemplary device approaching a container.

FIG. 4 is a side view of the exemplary device of FIG. 3 adjacent a container.

FIG. 5 is a side view of the exemplary device of FIGS. 3-4 being used to move a container.

DETAILED DESCRIPTION

This disclosure provides examples of devices for moving large containers. Many alternatives and modifications, which may or may not be expressly mentioned, are enabled, implied, and accordingly covered by the spirit of the disclosure. Although trashcans and "toter-style" trashcans are mentioned repeatedly herein, it should be understood that other large containers may be moved with devices described herein.

FIGS. 1 and 2 depict an exemplary device 10 sitting adjacent a container in the form of a standard "toter-style" trashcan 12. "Toter-style" trashcan 12 includes on one side 14 one or more wheels 16 and on the other side 18 a recess 20 in which a lift bar 22 is mounted. Lift bar 22 may be used to lift side 18 of trashcan 12 opposite wheels 16 off the ground so that trashcan 12 may be moved between locations.

Device 10 includes a first piece 24 with a planar portion 26 having a wheel mounted 28 at one side 30 and one or more press members 32 on the other side 34. Wheel 28 may be a caster wheel that is configured to swivel on a plane parallel to that of planar portion 26. Planar portion 26 is shaped on one side 36 to fit within recess 20 of a standard "toter-style" trashcan 12. Press members 32 may be elongate bars forming a portion of first piece 24 that are curved at the end of first piece 24 opposite planer portion 26 so that the ends will contact a side 38 of a container such as trashcan 10, as will be explained further below. Although device 10 of FIG. 1 includes two press members 32 that are curved relative to first piece 24, it should be understood that other numbers of press members, including only one, may be utilized. Additionally, while press members 32 are shown as being curved away from first piece 24, in some embodiments, press members 32 are not curved away from first piece 24.

A second piece 40 is attached to first piece 24 at a pivotal connection 42 that allows the two pieces to pivot about an axis 44. Second piece 40 includes on a first end 46 a lift portion 48 that is curved away from the rest of second piece 40. A handle 50 is provided at a second end 52 of second piece 40 opposite lift portion 48. In this non-limiting example, second piece 40 is constructed with an elongate bar 54, and handle 50 is a 180-degrees curved portion 56 of elongate bar 54. Parallel portions 58 of elongate bar 54 that extend between handle 50 and lift portion 48 are separated from each other by a distance 60 that is greater than a distance between outermost surfaces of press members 32, so that press members 32 fit between. The opposite may be true in some embodiments, and in yet other embodiments where only one press member is present, a different configuration may be implemented. In some embodiments, a separate handle connects two separate bars that form second piece 40.

FIGS. 3-5 depict an example of how first piece 24 and second piece 40 may pivot about axis 44 (indicated in FIGS. 1 and 2) relative to one another to function as a "claw" that grabs lift bar 22 of "toter-style" trashcan 12. In FIG. 3, the first and second pieces have not yet been pivoted about axis 44. Device 10 in this configuration may be tilted as shown in FIG. 3 so that it can be maneuvered easily between locations (e.g., towards a target trashcan).

Once the device is maneuvered so that lift bar 22 of "toter-style" trashcan 12 is in between press members 32 and lift portion 48, as shown in FIG. 4, device 10 may be manipulated so that press members 32 and lift portion 48 "clamp" onto lift bar 22, as shown in FIGS. 2 and 5. The beginning of this manipulation is shown In the middle of FIG. 4, where handle 50 has been pivoted downwards slightly (as indicated by the arrow) so that lift portion 48 has pivoted upwards (opposing gravity). Meanwhile, press members 32 have moved slightly to the left. In FIG. 5, handle 50 has been pivoted down further so that lift portion 48 on second piece 40 is moved further upwards and press members 32 on first piece 24 are moved towards the left. With this pivoting motion, lift portion 48 and press members 32 operate together like a claw to grip lift bar 22.

This simultaneous engagement is best seen in FIGS. 2 and 5. A downward force applied to handle 50 (as shown by the arrow in FIG. 4) imparts an opposite upward force on lift portion 48, by virtue of pivotal connection 42 of first piece 24 and second piece 40. Since lift portion 48 is curved, the overall force applied by lift portion 48 to lift bar 22 is at an angle relative to the ground. In other words, the force has a vertical component, which lifts trashcan 12 off the ground, and a horizontal component, which imparts force on lift bar 22 in a direction away from the surface (i.e., side 38) of trashcan 12. Accordingly, the horizontal component of the total force applied to lift bar 22 by lift portion 48 may be opposed by an equal and opposite force applied by lift bar 22 on lift portion 48 in a direction towards trashcan 12. This equal and opposite force may be exerted on first piece 24 to help secure planar portion 26 of first piece 24 within recess 20 of trashcan 12. As best seen in FIGS. 1 and 2, one end 36 of planar portion 26 is shaped to engage recess 20 of trashcan 12 to prevent lateral movement of device 10 along the side of trashcan 12.

Some embodiments may include mechanisms for preventing lift portion 48 and press member 32 from pivoting away from each other beyond a predetermined angle. For example, device 10 in FIGS. 1 and 2 includes a stop bar 62 with a longitudinal axis that is parallel to axis 44 of pivotal connection 42. Stop bar 62 in FIG. 2 is located on second piece 40 in between parallel portions 58 of elongate bar 54 adjacent pivotal connection 42. If handle 50 is pivoted downwards far enough, and hence lift portion 48 and press members 32 are pivoted away from each other to a particular predetermined angle, stop bar 62 will contact first piece 24, preventing further pivoting.

Devices according to the present disclosure may be constructed using any number of materials. In exemplary embodiments, the device is constructed from steel. In other embodiments, the device may be constructed from aluminum. Moreover, while the embodiments described above are manipulated using manual power (i.e., an individual pivots the handle down manually), embodiments that use electromechanical power or hydraulics to assist in lifting the container are also contemplated herein.

It is believed that the disclosure set forth above encompasses distinct embodiments with independent utility. While each of these embodiments has been disclosed in its preferred form, the specific embodiments as disclosed and illustrated herein are not to be considered in a limiting sense as numerous variations are possible.

The subject matter of the disclosure includes all novel and non-obvious combinations and subcombinations of the various elements, features, functions and/or properties disclosed herein. Similarly, where the disclosure recites "a" or "a first" element or the equivalent thereof, such disclosure should be understood to include incorporation of one or more such elements, neither requiring nor excluding two or more such elements. Novel and non-obvious combinations and subcombinations of features, functions, elements and/or properties may be claimed through presentation of claims in a related application.

What is claimed is:

1. A device for moving a container, comprising:
    a first piece having a longitudinal axis with a wheel adjacent one end and a laterally-extending portion adjacent the wheel; and
    a second piece attached to the first piece at a pivotal connection, the second piece including a lift portion on one side of the pivotal connection and a handle on an opposite side of the pivotal connection, the lift portion extending laterally away from a longitudinal axis of the second piece;
    wherein the handle is adapted to be pivoted about an axis of the pivotal connection to cause the lift portion to:
        lift a portion of the container in a direction; and
        press the laterally-extending portion against a vertical surface of the container to stabilize the first piece against the container such that the longitudinal axis of the first piece is approximately parallel to the direction.

2. The device of claim 1, wherein the vertical surface of the container is a first vertical surface, the device further comprising a press member on an end of the first piece opposite the pivotal connection from the wheel, the press member being adapted to press against the first vertical surface or a second vertical surface of the container when the lift portion lifts the portion of the container.

3. The device of claim 2, wherein the laterally-extending portion is a planar portion having a plane that is generally perpendicular to the first piece, the planar portion being shaped to fit at least partially within a recess of a toter-style trashcan.

4. The device of claim 2, wherein the pressing of the laterally-extending portion against the first vertical surface of the container is further facilitated by the press member pressing the first or second vertical surface of the container.

5. The device of claim 2, wherein the press member extends laterally away from the longitudinal axis of the first piece.

6. The device of claim 2, wherein the press member is configured to press against the first or second vertical surface of the container at the same time that the lift portion lifts the portion of the container.

7. The device of claim 6, wherein the press member and the lift portion are configured to cooperatively form a claw that grasps a horizontal bar extending parallel to a plane defined by the first vertical surface of the container.

8. The device of claim 1, wherein the lift portion curves away from the longitudinal axis of the second piece.

9. The device of claim 8, wherein the lift portion is configured to move upwards in response to the handle being pivoted downwards about the axis of the pivotal connection to lift a lift bar of a toter-style trashcan.

10. A method of moving a container with a device having first and second pieces attached to one another at a pivotal connection, the first piece having a wheel adjacent a first end and a press member at a second end, the second piece having a lift portion on one side of the pivotal connection and a handle on an opposite side of the pivotal connection, the method comprising:
    positioning the device adjacent the container so that the lift portion is underneath a horizontal lift bar of the container;
    pivoting the handle downwards to cause the lift portion to move upwards against a bottom of the horizontal lift bar and the press member to press against a vertical surface of the container, such that the press member and lift portion form a claw that encompasses the horizontal lift bar; and
    applying horizontal force to the handle to cause the lift portion to apply corresponding horizontal force against a surface of the horizontal lift bar, to move the device and the container horizontally across a surface.

11. The method of claim 10, further comprising maneuvering into a recess of the container a laterally-extending portion adjacent the wheel on the first piece, to prevent lateral movement of the first piece along the vertical surface of the container.

12. A device for moving a container, comprising:
    a first piece extending along a first longitudinal axis with a press member extending laterally away from the first longitudinal axis from one end of the first piece:
    a second piece extending along a second longitudinal axis with a lift portion extending laterally away from the second longitudinal axis from one end of the second piece;
    a pivotal connection between the first and second pieces;
    wherein the end of the second piece opposite the lift portion is manipulable to:
        cause the lift portion and the press member to pivot towards each other about an axis of the pivotal connection to cooperatively grab a lift bar of the container and lift one side of the container in a direction without lifting another, opposite side of the container; and cause the first piece to be stabilized against the container in a position in which the first longitudinal axis is approximately parallel to the direction.

13. The device of claim 12, wherein the first piece includes a wheel at an end opposite the press member.

14. The device of claim 13, wherein once the lift portion and press member have grabbed the lift bar, the end of the second piece opposite the lift portion is manipulable to move the container across a horizontal surface on the wheel.

15. The device of claim 12, wherein the second piece includes a single elongate bar with a 180° curved portion that forms a handle at the end of the second piece opposite the lift portion.

16. The device of claim 12, wherein at least one of the first and second pieces includes a stop bar configured to prevent the lift portion and press member from pivoting away from each other beyond a predetermined angle, the stop bar having a longitudinal axis that is parallel to the axis of the pivotal connection.

* * * * *